(12) United States Patent
Akabane et al.

(10) Patent No.: US 7,162,152 B2
(45) Date of Patent: Jan. 9, 2007

(54) POSITION DETECTING DEVICE OF LENS BARREL WITH DISK-SHAPED MAGNET AND SENSOR CHIP

(75) Inventors: Makoto Akabane, Suwa-gun (JP); Yukio Furuya, Suwa-gun (JP)

(73) Assignee: Nidec Sankyo Corporation, Nagano (JP)

( * ) Notice: Subject to any disclaimer, the term of this patent is extended or adjusted under 35 U.S.C. 154(b) by 153 days.

(21) Appl. No.: 10/991,837

(22) Filed: Nov. 18, 2004

(65) Prior Publication Data

US 2005/0152689 A1    Jul. 14, 2005

(30) Foreign Application Priority Data

Nov. 19, 2003 (JP) .............................. 2003-388958

(51) Int. Cl.
*G03B 17/00* (2006.01)
*G02B 7/02* (2006.01)
*G01R 27/08* (2006.01)

(52) U.S. Cl. .................. 396/87; 359/824; 324/207.11
(58) Field of Classification Search .................. 396/87, 396/89, 133; 359/823, 824, 696–698; 307/419; 324/207.11
See application file for complete search history.

(56) References Cited

U.S. PATENT DOCUMENTS

| 5,208,535 | A | * | 5/1993 | Nakayama et al. ......... 324/318 |
| RE34,355 | E | * | 8/1993 | Takahashi et al. ..... 324/207.21 |
| 5,847,874 | A | * | 12/1998 | Sasao et al. ................ 359/554 |
| 6,243,023 | B1 | * | 6/2001 | Katagiri ................ 340/870.03 |
| 6,324,023 | B1 | * | 11/2001 | Nagaoka et al. ............ 359/824 |
| 2003/0161049 | A1 | * | 8/2003 | Okada et al. ............... 359/696 |

FOREIGN PATENT DOCUMENTS

JP    2000- 144055    11/2001

* cited by examiner

*Primary Examiner*—Christopher Mahoney
*Assistant Examiner*—Chia-how Michael Liu
(74) *Attorney, Agent, or Firm*—Reed Smith LLP

(57) ABSTRACT

A position detecting device for detecting a position of a movable body which is moved by a drive system having a rotation body includes a magnetic part having an N-pole and an S-pole on a face of the rotation body and a sensor chip having at least a magneto-resistive element. The face of the rotation body is perpendicular to the rotation shaft of the rotation body and the sensor chip is provided so as to face the magnetic part for detecting a variation of magnetic field by the magneto-resistive element when the magnetic part is rotated with the rotation body. A little space is required for mounting the sensor chip having the magneto-resistive element and therefore downsizing can be attained.

12 Claims, 6 Drawing Sheets

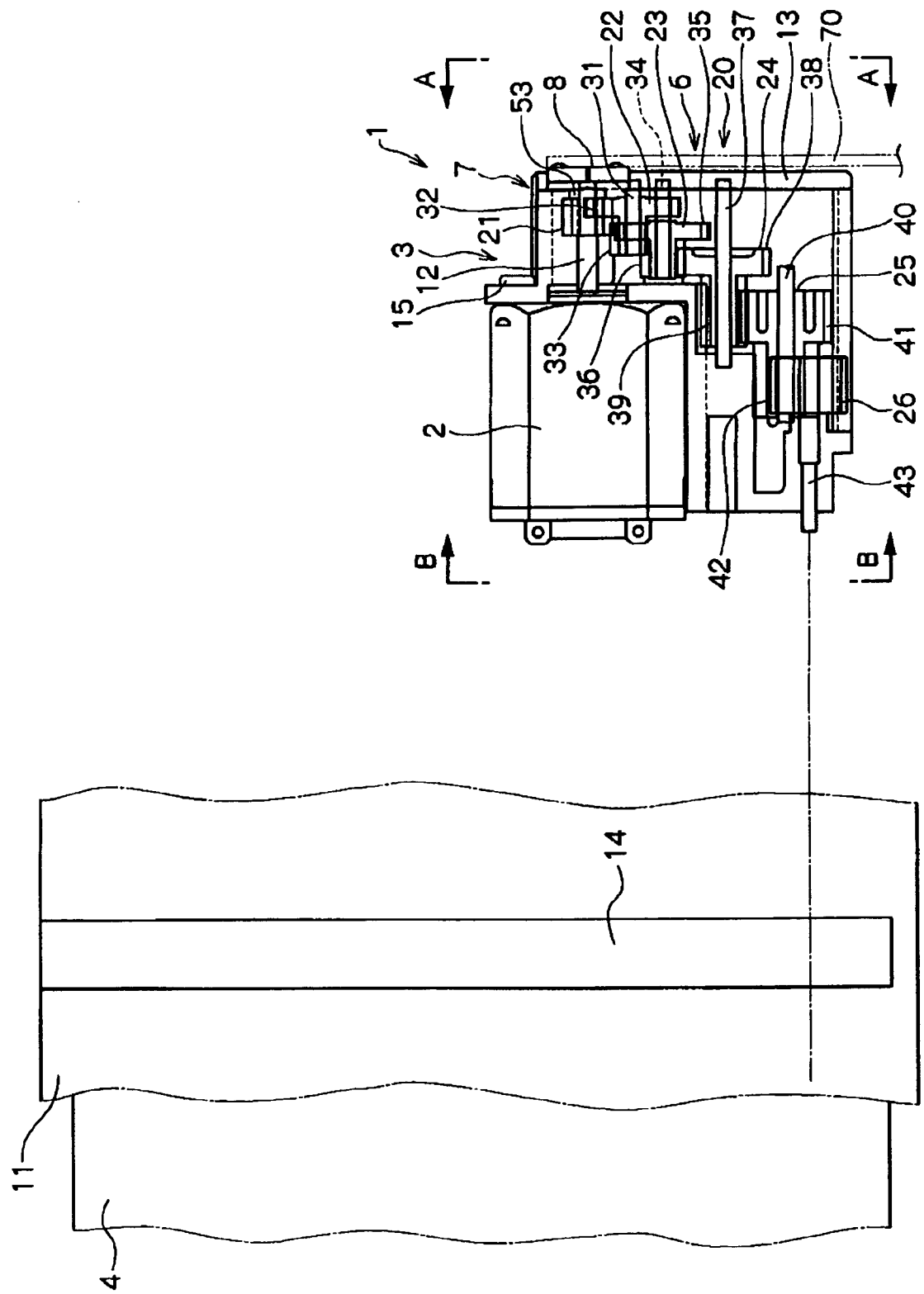
[Fig.1]

[Fig.2]
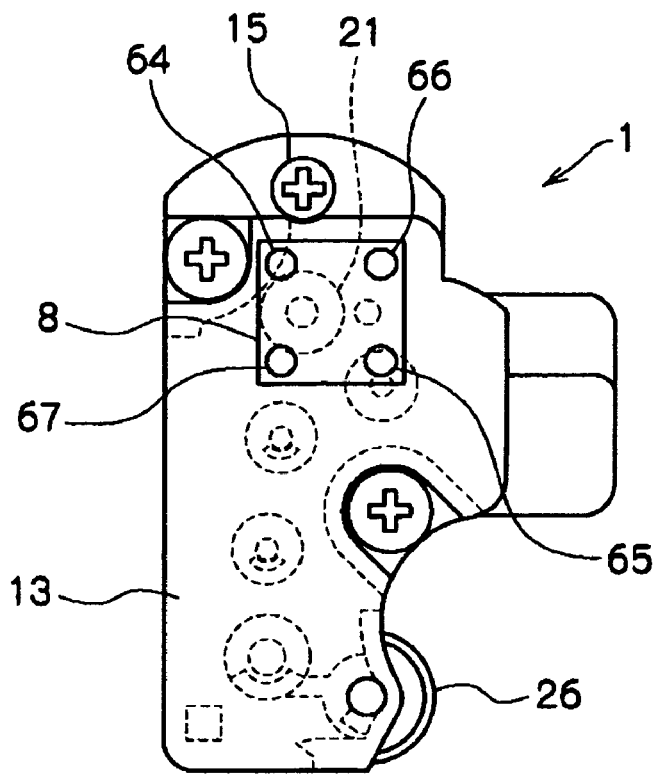
[Fig.3]
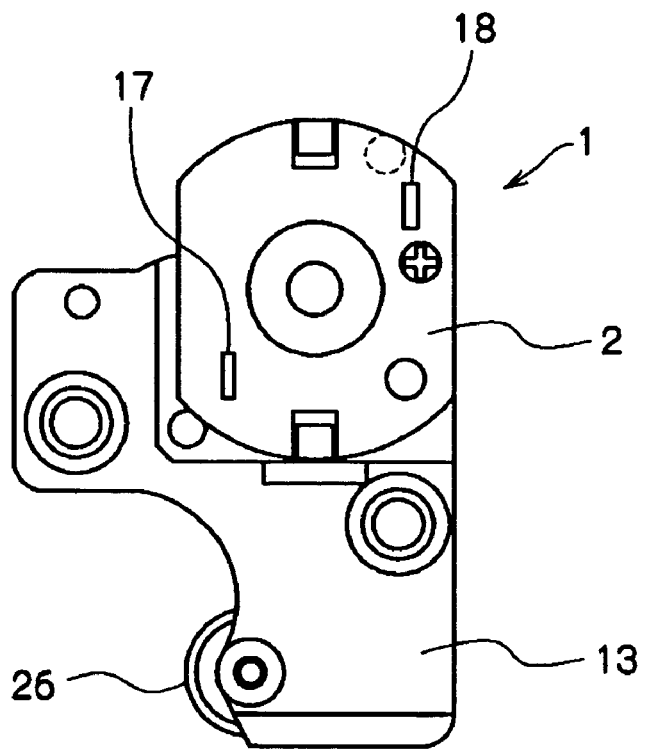

[Fig.4]
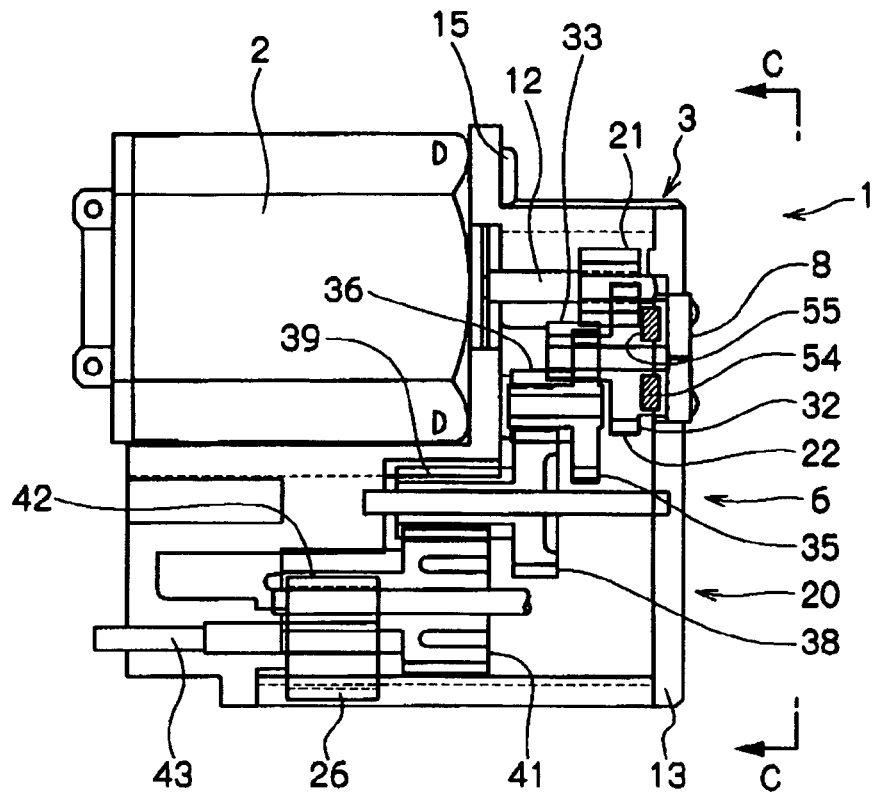
[Fig.5]
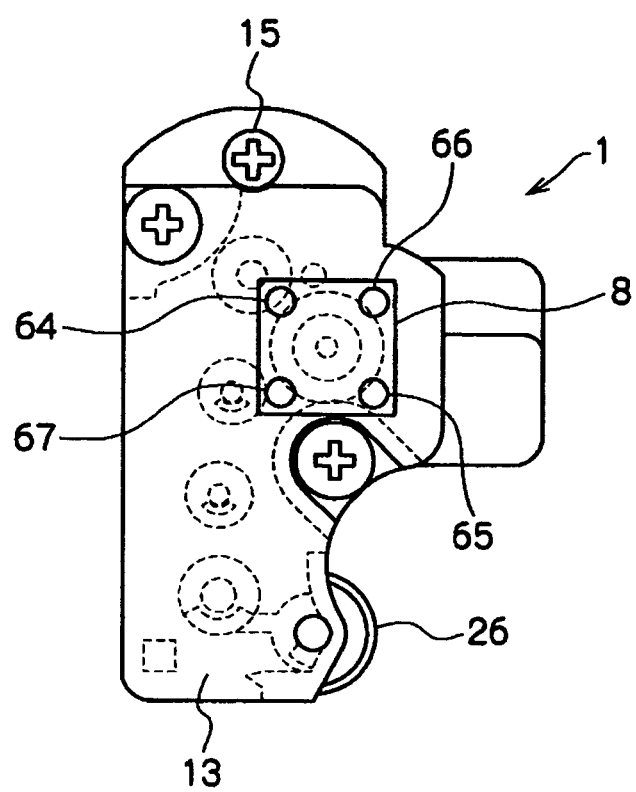

[Fig. 6]
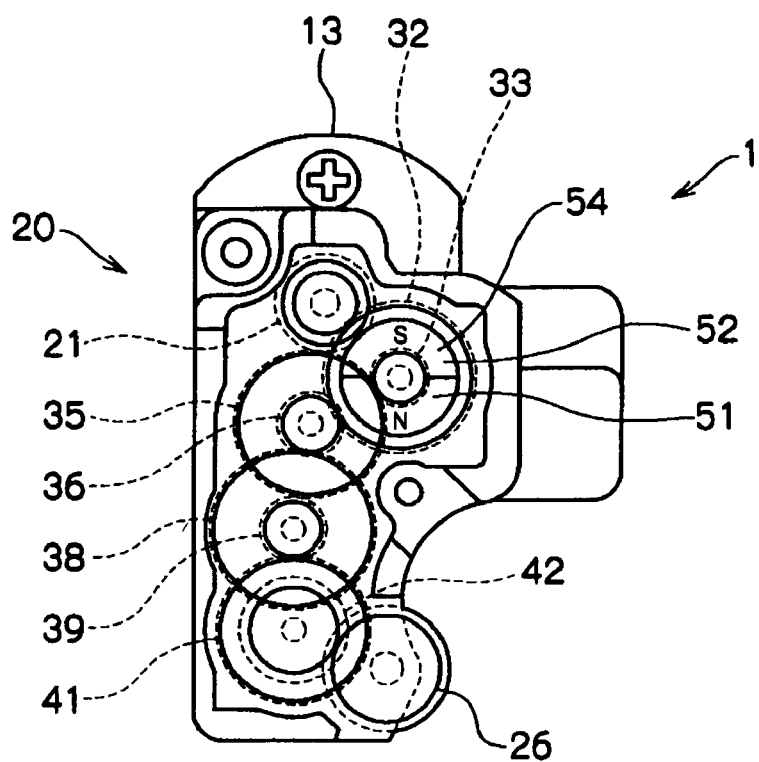
[Fig. 7]
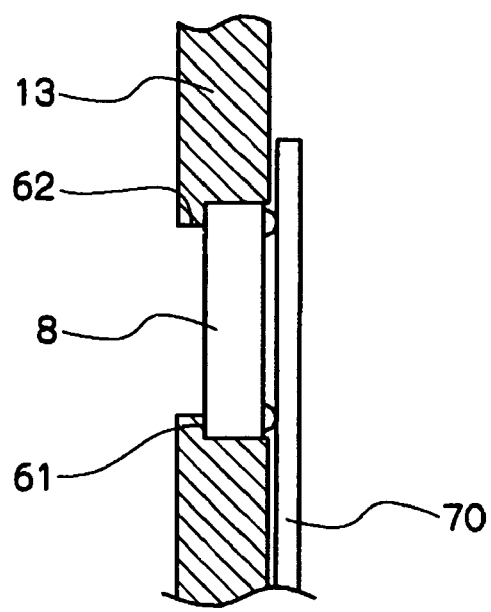

[Fig.8]
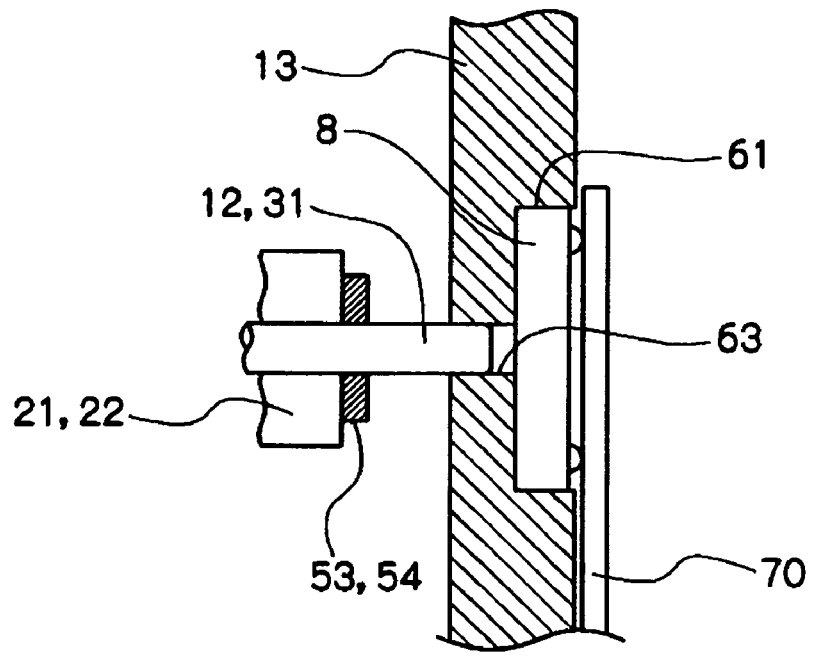
[Fig.9]
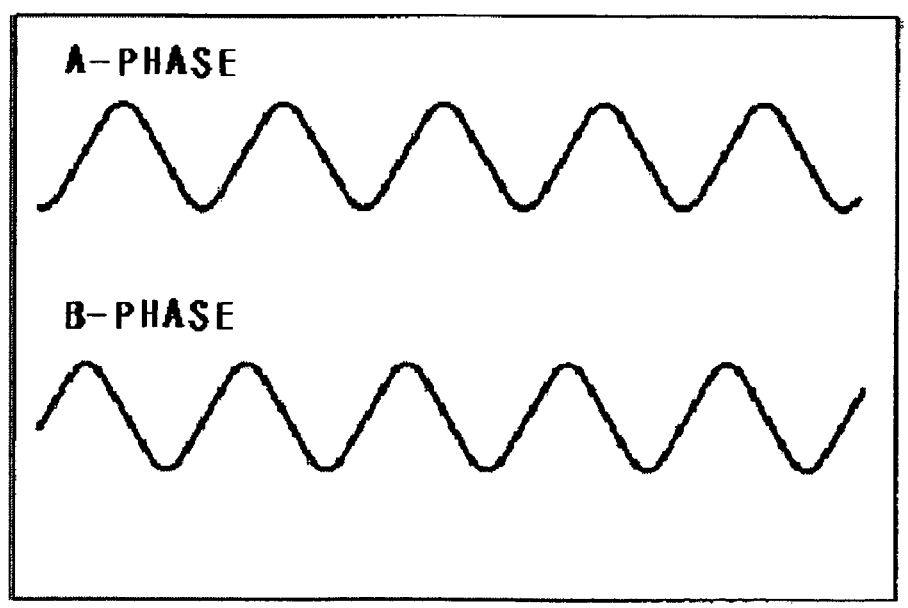

[Fig.10]
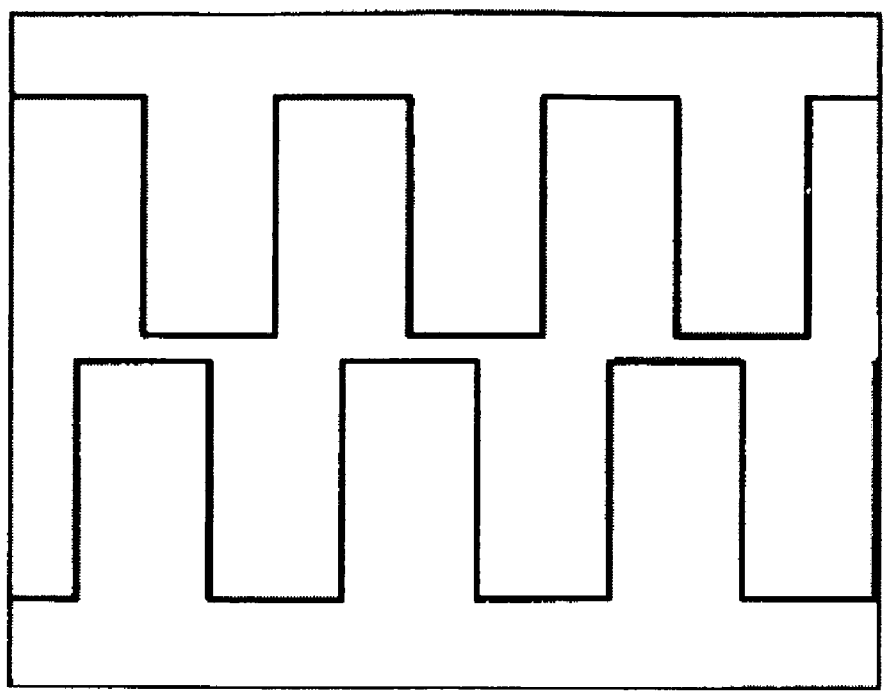

POSITION DETECTING DEVICE OF LENS BARREL WITH DISK-SHAPED MAGNET AND SENSOR CHIP

CROSS-REFERENCE TO RELATED APPLICATIONS

This application claims priority to Japanese Application No. 2003-388958 filed Nov. 19, 2003, which is incorporated herein by reference.

FIELD OF THE INVENTION

The present invention relates to a position detecting device for detecting the position of a movable body which is moved by a drive system having a rotation body. More specifically, the present invention relates to a position detecting device capable of saving space.

BACKGROUND OF THE INVENTION

It is often important for a device or an equipment having a movable body to ascertain the position of the movable body to perform control or operation. For example, some cameras such as a digital camera, a video camera or the like are constructed such that a zoom lens (lens-barrel) is moved by a motor when the focal length and the magnifying power of a lens system are changed. A reversibly rotatable motor is used as the motor. However, the motor itself is not provided with a positional information and thus a position detecting device for detecting the position of a zoom lens is separately provided (for example, see Japanese Patent Laid-Open No. 2001-324664).

The conventional position detecting device detects the position of a lens-barrel provided with the zoom lens and includes a light-shielding plate and two photo interrupters. The lens-barrel is mounted on the main body of a camera in a movable manner in the optical axis direction and is moved by a motor through a transmission means or the like. The focal length of a photographic optical system varies according to the movement of the lens-barrel.

The transmission means that moves the lens-barrel is a deceleration gear mechanism comprised of transmission wheels such as a gear. A shutter blade having three blades as the light-shielding plate is mounted on one of the gears constructing the deceleration gear mechanism. Three blades are disposed at 120 degree interval and two photo interrupters are disposed so as to be opposed to the three blades. The photo interrupter comprises of a light-emitting element and a light receiving element. The photo interrupter detects the passage of the blade between the light-emitting element and the light receiving element. A detected output signal is converted into a pulse and the number of revolutions of the motor is detected by counting the converted pulses. Accordingly, the position of the lens-barrel is detected by detecting the number of revolutions of the motor.

The two photo interrupters are disposed at 150 degree interval to detect the direction of rotation of the rotation shaft of the motor. When the motor is driven so that the shutter blade rotates in one direction, the output waveform of one of the photo interrupters leads ahead that of the other photo interrupter by a ¼ period. When the motor is driven so that the shutter blade rotates in the reverse direction, the output waveform of the one of the photo interrupters lags behind that of the other photo interrupter by a ¼ period. As a result, the difference of the output relations in the two photo interrupters is generated depending on the rotating direction of the shutter blade, that is, the rotation shaft of the motor, and therefore the rotating direction of the motor can be detected according to the difference. Consequently, the position of the lens-barrel can be accurately detected.

Cameras such as a digital camera or video cameras have been especially attempting to make their sizes smaller in recent years. A position detecting device equipped on the camera, the video camera or the like is also required to be made smaller. However, since the position detecting device is constructed such that the position of the lens-barrel is detected by using the shutter blade and the photo interrupter, a space for mounting the shutter blade and the photo interrupter, especially a space for mounting the photo interrupter is required, which causes the position detecting device to be difficult to downsize.

Also, in order to accurately detect the number of revolutions of the motor, the shutter blade is preferably arranged on the rotation shaft of the motor and the photo interrupter is disposed in the vicinity of the rotation shaft. However, a little vacant space is left in the vicinity of the rotation shaft of the motor for arranging the shutter blade and the photo interrupter and thus downsizing is not attained. Further, when two photo interrupters are used to accurately detect the position of the lens-barrel, a large space for disposing them is required and the number of component parts increases which further prevents downsizing.

SUMMARY OF THE INVENTION

In view of the problems described above, it is an object and advantage of the present invention to provide a position detecting device which is capable of attaining downsizing.

In order to achieve the above object and advantage, according to an embodiment of the present invention, there is provided a position detecting device for detecting the position of a movable body which is moved by a drive system having a rotation body including a magnetic part having an N-pole and an S-pole on the face of the rotation body which is perpendicular to the rotation shaft of the rotation body, and a sensor chip having a magneto-resistive element and provided so as to face the magnetic part for detecting a variation of magnetic field by the magneto-resistive element when the magnetic part is rotated with the rotation body.

According to the embodiment of the present invention, the sensor chip can be formed, for example, in a plate-like shape by arranging the magneto-resistive element in a plane configuration and thus a mounting space becomes small in comparison with a photo interrupter and downsizing can be attained. Further, in accordance with an embodiment of the present invention, the sensor chip is accommodated in a chip receiving recessed part, for example, of a fixed body, and the magnet that is the magnetic part is accommodated in a magnet receiving recessed part of the transmission wheel. According to the construction described above, a space for mounting the sensor chip and the magnet is almost not required and further downsizing can be achieved.

In accordance with embodiments of the present invention, the position detecting device is preferably constructed as follows.

(a) The movable body is a lens-barrel whose focal length of a photographic optical system varies according to movement in an optical axis direction by the drive system.

(b) The sensor chip includes a plurality of magneto-resistive elements and detection signals detected by the plurality of magneto-resistive elements are outputted as the detection signals of two phase sinusoidal waveforms which are shifted by 90 degrees from each other.

(c) The sensor chip is accommodated in a chip receiving recessed part provided on a fixed body such as a case or a frame.

(d) The drive system includes at least a motor and a transmission means for transmitting an output of the motor by using a transmission wheel, and the magnetic part is a disk-shaped magnet formed in a smaller diameter than the transmission wheel and the magnet is accommodated in a magnet receiving recessed part provided on the transmission wheel.

(e) The magnet is magnetized in an N-pole over a half of the side face of the disk-shaped magnet in the circumferential direction and in an S-pole over a remaining half of the side face of the disk-shaped magnet.

(f) The transmission wheel is attached on the rotation shaft of the motor and the magnet is mounted on the transmission wheel.

As described above, according to the position detecting device of the present invention, a little space is required for mounting the sensor chip having the magneto-resistive element and therefore downsizing can be attained. Further, in accordance with the embodiment of the present invention, the sensor chip is accommodated in the chip receiving recessed part formed on the fixed body and the magnet is accommodated in the magnet receiving recessed part formed on the transmission wheel. In this case, the extra space for mounting the sensor chip and the magnet as the magnetic part are almost not required, further downsizing can be attained.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

FIG. 1 is a schematic side view showing a position detecting device in accordance with an embodiment of the present invention.

FIG. 2 is a view of the position detecting device which is viewed from the arrow direction "A—A" shown in FIG. 1.

FIG. 3 is a view of the position detecting device which is viewed from the arrow direction "B—B" shown in FIG. 1.

FIG. 4 is a schematic side view showing a position detecting device in accordance with another embodiment of the present invention.

FIG. 5 is a view of the position detecting device viewed from the arrow direction "C—C" shown in FIG. 4.

FIG. 6 is a view showing the engaging state of gears in the position detecting device shown in FIG. 4.

FIG. 7 is a schematic cross-sectional view showing the mounting state of a sensor chip in accordance with an embodiment of the present invention.

FIG. 8 is a schematic cross-sectional view showing the mounting state of a sensor chip in accordance with another embodiment of the present invention.

FIG. 9 is a view showing the waveforms of output signals generated from the sensor chip in accordance with an embodiment of the present invention.

FIG. 10 is a view showing the processed waveforms of the output signals generated from the sensor chip.

DETAILED DESCRIPTION OF THE PREFERRED EMBODIMENTS

A position detecting device in accordance with an embodiment of the present invention will be described in detail below with reference to the accompanying drawings. FIGS. 1 through 3 are views showing a position detecting device in accordance with an embodiment of the present invention. FIGS. 4 through 6 are views showing a position detecting device in accordance with another embodiment of the present invention.

The position detecting device in accordance with the embodiment of the present invention is, as shown in FIGS. 1 through 6, a position detecting device for detecting the position of a movable body 4 which is moved by a drive system 3 having a rotation body. The position detecting device includes a magnetic part 7 comprising of an N-pole and an S-pole on a face perpendicular to the rotation shaft of the rotation body and a sensor chip 8 which is provided so as to be opposed to the magnetic part 7 and is constructed such that the variation of magnetic field is detected by at least a magneto-resistive element at the time of rotation of the magnetic part 7 together with the rotation body.

The movable body 4 is an object which is moved by the drive system 3, for example, a lens-barrel provided on a camera such as a digital camera, a video camera or the like.

An embodiment where the lens-barrel 4 is used as the movable body will be described below. The lens-barrel 4 including a zoom lens (not shown) is engaged with a cam cylinder 11 through a cam means (not shown) and moves in an optical axis direction through the cam means by means of the cam cylinder 11 being turned. The focal length of a photographic optical system varies according to the movement of the lens-barrel 4.

The drive system 3 is used to move the lens-barrel 4. Therefore, when a motor 2 can directly turn the cam cylinder 11, only the motor 2 may construct the drive system 3. In a typical embodiment, a transmission means 6 for transmitting the rotating force of the motor 2 is provided in addition to the motor 2.

The motor 2 is a reversibly rotatable motor that is, for example, a DC motor which does not have a positional information of a rotation shaft (output shaft) 12. In this embodiment of the present invention, the rotation shaft of the motor 2 will be referred to as the "output shaft" in order to distinguish the rotation shaft of the rotation body from the rotation shaft of the motor 2. The motor 2 is fixed, for example, by screws 15 on a case 13 which is formed of plastic material or the like. In FIG. 3, the notational symbols 17 and 18 respectively show a motor terminal.

The transmission means 6 is appropriately constructed depending on a device or an equipment to which the position detecting device 1 according to the present invention is installed. Typically, the transmission means 6 includes a transmission wheel such as a gear or a pulley. In other words, the transmission means 6 may decelerate or accelerate the turning force (rotation speed) of the motor 2. Alternatively, for example, the transmission means 6 may merely transmit the rotation of the output shaft of the motor 2 to a rotation shaft that is disposed at substantially 90 degree different from the output shaft. Concretely, for example, a reduction gear mechanism 20 may be used as the transmission-means.

The reduction gear mechanism 20 is housed together with the motor 2 within a case 13. The reduction gear mechanism 20 includes, for example, a first gear 21 fixed on the output shaft 12 of the motor 2 and a second through a sixth gears 22, 23, 24, 25, 26 engaging with the first gear 21 and transmitting the rotating force of the motor 2 while decelerating.

The first gear 21 is fixed on the output shaft 12 of the motor 2 by press fitting or the like. A gear fixed on the output shaft of the motor is usually used as the first gear 21 and, for example, a spur gear is used. The first gear 21 is, for example, formed of polyacetal, nylon, metal or the like.

The second through the sixth gears 22, 23, 24, 25, 26 may be preferably those which are capable of transmitting the rotating force of the motor 2 while decelerating. For example, the second through the fifth gears 22, 23, 24, 25 may be respectively comprised of a double gear having a large spur gear and a small spur gear with two different diameters as shown in FIGS. 1, 4 and 6, and the sixth gear 26 may be a spur gear. In the embodiment described above, the second through the fifth gears 22, 23, 24, 25 include large spur gears 32, 35, 38, 41 and small spur gears 33, 36, 39, 42 with smaller diameters than those of the large gears 32, 35, 38, 41. The second through the sixth gears 22, 23, 24, 25, 26 are respectively rotatably supported on respective shaft bodies 31, 34, 37, 40, 43.

Both end portions of each of the shaft bodies 31, 34, 37, 40, 43 are mounted on support holes (not shown) that are formed in a fixed body such as the case 13. A shaft which is used in a general reduction gear mechanism is preferably used as the shaft bodies 31, 34, 37, 40, 43 and, for example, a shaft formed of stainless steel may be used. The shaft bodies 31, 34, 37, 40, 43 may be formed of resin in an integral manner with the case. The second through the sixth gears 22, 23, 24, 25, 26 may utilize a gear which is generally used in a reduction gear mechanism. The second through the sixth gears 22, 23, 24, 25, 26 may be formed, for example, of plastic material such as polyacetal, nylon, elastomer and a metal material may be incorporated in a portion where the strength is required.

In the embodiment shown in FIGS. 1, 4 and 6, the large gear 32 of the second gear 22 engages with the first gear 21, the small gear 33 of the second gear 22 engages with the large gear 35 of the third gear 23, the small gear 36 of the third gear 23 engages with the large gear 38 of the fourth gear 24, the small gear 39 of the fourth gear 24 engages with the large gear 41 of the fifth gear 25, and the small gear 42 of the fifth gear 25 engages with the sixth gear 26. A prescribed ratio of the number of revolutions can be obtained by setting the gears 21, 32, 33, 35, 36, 38, 39, 41, 42, 26 in prescribed diameters. With respect to the diameters of the gears, for example, the diameter of the large gear 38 of the fourth gear 24 may be the largest, those of the large gear 35 of the third gear 23 and the large gear 41 of the fifth gear 25 are larger, and, subsequently in the order of larger diameter, respective diameters are set as follows; the large gear 32 of the second gear 22, the sixth gear 26, the small gear 42 of the fifth gear 25, the first gear 21, the small gear 36 of the third gear 23 and the small gear 39 of the fourth gear 24, and then the small gear 33 of the second gear 22. According to the construction described above, the number of revolutions of the motor 2 can be decelerated to an arbitrary number of revolutions.

In the embodiment shown in FIGS. 1, 4 and 6, the sixth gear 26 engages with a gear 14 provided on the outer periphery of the cam cylinder 11 such that the rotating force of the motor 2 is transmitted to the gear 14 in a decelerated condition.

In accordance with the embodiment of the present invention, as shown in FIGS. 1, 2, 4, 5 and 6, a magnetic part 7 having an N-pole 51 and an S-pole 52 is provided on a face perpendicular to the rotation shaft of the rotation body, and a sensor chip 8 is provided which detects with at least a magneto-resistive element (not shown) the variation of magnetic field, for example, the variation of the direction of magnetic field when the magnetic part 7 is rotated together with the rotation body.

The magnetic part 7, which is one of the feature portions of the present invention, rotates with the rotation body and comprises the N-pole 51 and the S-pole 52. The magnetic part 7 may be constructed in various embodiments in which magnetic field can be generated by the N-pole 51 and the S-pole 52. Any rotating body may be used as the rotation body for the magnetic part 7. For example, the output shaft 12 of the motor 2, the first through the sixth gears 21, 22, 23, 24, 25, 26 constructing the reduction gear mechanism 20, or the like may be used as the rotation body for the magnetic part 7.

As a concrete example of the magnetic part 7, two magnetic poles of the N-pole and the S-pole may be individually provided on the side face of a gear (face where teeth are not formed) which constructs the reduction gear mechanism 20. Preferably, magnets 53, 54 magnetized with the N-pole 51 and the S-pole 52 may be used. When a gear constructing the reduction gear mechanism 20 is formed of material having magnetism, the gear is magnetized with two magnetic poles of an N-pole and an S-pole to be constructed as the magnetic part 7. Normally, since the gear constructing the reduction gear mechanism 20 is form of nonmagnetic material, the magnets 53, 54 are preferably used as the magnetic part.

The magnets 53, 54 may be formed in any shape and for example, they are preferably formed in a circular disk shape. The N-pole 51 and the S-pole 52 are magnetized on one side of the magnets 53, 54 (one of two flat faces which are not the circumferential surface) formed in a circular disk shape. The N-pole 51 and the S-pole 52 may be magnetized on one of the side faces of the magnets 53, 54 in any way but are preferably magnetized over the same ratio in the circumferential direction. The number of the N-pole 51 and the S-pole 52 magnetized in the magnets 53, 54 may be, for example, either of even numbers such as 2, 4, 6 or the like when the N-pole 51 and the S-pole 52 are disposed alternately. In the present embodiment, the number of the N-pole 51 and the S-pole 52 is two. In other words, the circular disk-like magnet, which is magnetized with the N-pole 51 over the half of one side face in the circumferential direction and with the S-pole 52 over the remaining half of the one side face in the circumferential direction, is preferably used as the magnets 53, 54 as shown in FIG. 6.

The magnets 53, 54 may be separately mounted on the output shaft 12 of the motor 2 instead of the first gear 21 or may be directly mounted (fixed) on the gear included in the reduction gear mechanism 20. In the embodiment shown in the drawing, the magnets 53, 54 are fixed on the gear.

The magnets 53, 54 are preferably formed in a diameter such that they do not interfere with another member, for example, the gears 21, 22, 23, 24, 25, 26, the output shaft 12, the shaft bodies 31, 34, 37, 40, 43, the case 13 or the like so as not to affect the transmitting force of the motor 2. The diameters of the magnets 53, 54 are preferably set to be those which are smaller than the diameter of a gear (diameter of dedendum) where they are mounted and are capable of sufficiently detecting the variation of magnetic field by the sensor chip 8 described later. In other words, the diameters of the magnets 53, 54 are preferably formed in a dimension which is smaller than the diameter of a gear (diameter of dedendum) where they are mounted and are as close as possible to the diameter of the gear (diameter of dedendum).

The magnets 53, 54 may be mounted on any gear in a plurality of gears constructing the reduction gear mechanism 20. In the embodiment of the present invention, considering space saving, accuracy and the like, the magnets are preferably mounted on the gear where the variation of the direction of magnetic field can be detected with the sensor chip 8 at the time of the rotation of the magnets 53, 54 even when the sensor chip 8 is mounted on a fixing body such as the existing case, frame or cover. In addition, the above-mentioned gear is preferably the output shaft 12 of the motor 2 or the gear close to the output shaft 12 in the drive transmitting path from the output shaft 12. Concretely, for example, in the deceleration gear train, the first gear 21 or the second gear 22 is preferably used as shown in FIG. 1 or FIGS. 4 and 6, and especially the first gear 21 is preferably used. Alternatively, in the accelerating gear train, when the number of revolutions increases, the detection accuracy is enhanced. Therefore, the gear on which the magnets are mounted is preferably a final gear, a gear engaging with the final gear, or a gear in its vicinity in the gear train.

One of side faces of the gear 22 on which the magnet 54 is mounted, which is opposed to the case 13, is preferably formed with a magnet receiving recessed part 55 for accommodating the magnet 54 in a coaxial state with the gear 22 such that the side face of the magnet faces with the case 13. The magnet receiving recessed part 55 is preferably formed in the dimension which can accommodate the magnet 54. When the magnet receiving recessed part 55 is formed in a slightly larger dimension than the magnet 54, it is especially preferable because the magnet 54 can be fitted on the recessed part 55. According to the construction described above, the magnet 54 does not interfere with other gears because the magnet 54 is accommodated in the magnet receiving recessed part 55. In FIG. 1, the magnet receiving recessed part is not provided on the first gear 21 because the opposing relationship of the magnet 53 and the sensor chip 8 is easily understood. However, the magnet receiving recessed part may be preferably provided on the first gear 21 so as to accommodate the magnet 53 in the magnet receiving recessed part.

The sensor chip 8 is, as shown in FIGS. 1, 2, 4 and 5, disposed so as to be opposed to the magnets 53, 54 and includes at least a magneto-resistive element (not shown) for detecting the variation of the direction of magnetic field at the time of the rotation of the magnets 53, 54.

Any sensor chip having at least a magneto-resistive element for detecting the variation of the direction of magnetic field is used as the sensor chip 8. For example, the sensor chip 8 is formed in a flat plate shape which is a square shape whose one side length is longer than the diameter of the magnets 53, 54 and whose thickness is thinner than the photo interrupter.

A plurality of magneto-resistive elements, whose electrical resistance varies in accordance with the variation of the direction of magnetic field at the time of the rotation of the magnets 53, 54, are provided inside of the face (sensitive surface) of the sensor chip 8 opposed to the magnet 53, 54. The magneto-resistive elements are constructed to detect the position of the magnets 53, 54 and disposed so that A-phase and B-phase detection signals having phases shifted by 90 degrees from each other can be obtained in order to detect the rotating direction of the magnets 53, 54. Alternatively, a magneto-resistive element may be used whose electrical resistance varies in accordance with the variation of the magnetic field strength.

On the face on the opposite side to the above-mentioned sensitive surface of the sensor chip 8 are provided a power supply terminal (Vcc) 64 and a ground terminal (G) 65 in the vicinity of two opposed corner portions as shown in FIGS. 2 and 5. An A-phase output terminal 66 and a B-phase output terminal 67 are provided in the vicinity of two remaining opposed corner portions. These terminals 64, 65, 66, 67 are, as shown in FIG. 1, electrically connected by soldering or adhesion to a flexible wiring circuit board (FPC) 70 which is disposed on the case 13 on the opposite side of the magnets 53, 54.

On the flexible wiring circuit board 70 are mounted a circuit and the like for detecting the number of revolutions of motor 2 (position of lens-barrel 4) based on a signal from the sensor chip 8. The circuit and the like are, for example, a differential amplifier (not shown), a counter (not shown), a control circuit (not shown) and the like, where the waveform shaping of the signal from the sensor chip 8 is performed to be in a pulse train and the pulse number of the pulse train is counted to detect the number of revolutions of the motor 2 (position of lens-barrel 4).

The sensor chip 8 may be arranged at any place where the variation of the direction of magnetic field can be detected at the time of the rotation of the magnets 53, 54 within the magnetic field of the magnets 53, 54 that is the magnetic part 7. For example, the sensor chip 8 is preferably disposed on a fixed body such as a case, a frame or a cover, which faces the surface of the magnet 53, 54 as described above. For example, the sensor chip 8 is preferably disposed on the case 13 as shown in FIGS. 1, 2, 4, 5, 7 and 8. In other words, for example, the N-pole 51 and the S-pole 52 are magnetized in the circumferential direction on one of the side faces of the disk-shaped magnets 53, 54. Therefore, the magnetic field generated by the magnets 53, 54 becomes larger in comparison with the case in which the N-pole and the S-pole are alternately arranged on a circumferential face of the disk-shaped magnet. Accordingly, the magnets 53, 54 and the sensor chip 8 can be disposed in a separated state to some extent. For example, considering space saving, accuracy and the like, even when the sensor chip 8 is mounted on the face of the case 13 on the opposite side of the reduction gear mechanism 20, and even when the magnets 53, 54 are mounted on the first gear 21 or the second gear 22, the variation of the direction of magnetic field at the time of rotation of the magnets 53, 54 can be sufficiently detected by the sensor chip 8.

The case 13 on which the sensor chip 8 is disposed is preferably provided with a chip receiving recessed part 61 for accommodating the sensor chip 8 such that its sensitive surface faces the magnets 53, 54 as shown in FIGS. 7 and 8. The chip receiving recessed part 61 is preferably disposed on the face of the case 13 on the opposite side to the magnets 53, 54 (reduction gear mechanism 20). The chip receiving recessed part 61 is preferably formed in a dimension capable of accommodating the sensor chip 8 although it depends on the thickness of the case 13. When the chip receiving recessed part 61 is formed in a little larger dimension than the sensor chip 8, it is especially preferable because the sensor chip 8 can be fitted to it.

On the face (magnet opposing face) of the case 13 provided with the chip receiving recessed part 61, which faces the magnets 53, 54, may be formed, for example, as shown in FIG. 7, a square-shaped penetration part 62 which is a little smaller than the sensor chip 8 in order to improve the sensibility of the magneto-resistive element by means that the sensitive surface of the sensor chip 8 faces the magnets 53, 54 in an exposed state. Further, when the case 13 is formed of nonmagnetic material, on the magnet opposing face of the case 13 may be formed a support hole for rotatably supporting the output shaft 12 or a mounting hole 63 for attaching the shaft body 31.

Next, the operation of the position detecting device 1 in accordance with the embodiment of the present invention will be described below.

When the motor 2 is driven to rotate the output shaft 12, the first through the sixth gears 21, 22, 23, 24, 25, 26 are consecutively driven and rotated. Since the sixth gear 26 engages with the gear 14, the cam cylinder 11 is turned. The lens-barrel 4 moves in the optical axis direction through a cam means by turning the cam cylinder 11 to vary the focal length of the photographic optical system.

The magnets 53, 54 which are the magnetic portion 7 for generating magnetic field are fixed on the first gear 21 or the second gear 22, and thus the magnets 53, 54 are also rotated. Therefore, the direction of magnetic field generated from the magnets 53, 54 varies according to the rotation of the magnets. The sensor chip 8 is disposed within the magnetic field and the electric resistance of the magneto-resistive element in the sensor chip 8 varies depending on the change of the direction of the magnetic field. The change of the electric resistance is outputted from the sensor chip 8 to the flexible wiring circuit board 70 as a detection signal. The waveforms of the output signal (the waveform of A-phase between the output terminal 66 and the ground terminal 65, and the waveform of B-phase between the output terminal 67 and the ground terminal 65) are, for example, sinusoidal waveforms of two phases as shown in FIG. 9. The waveform shaping is performed on the signals from the sensor chip 8 by the circuit or the like mounted on the flexible wiring circuit board 70. The waveforms are, for example, two-phase waveforms of pulse train as shown in FIG. 10. The calculation of the waveforms of the pulse train is used to detect the rotation number or the direction of rotation and thus the position of the lens-barrel 4 or the like is detected.

A plurality of magneto-resistive elements arranged in the sensor chip 8 are disposed so that the A-phase and the B-phase detection signals having phases shifted by 90 degrees from each other can be obtained. Accordingly, the waveforms of the signals and the pulse trains from the sensor chip 8 become two phase waveforms as shown in FIGS. 9 and 10. One of the waveforms leads ahead the other by a ¼ period. When the motor 2 is driven to rotate the output shaft 12 in the reverse direction, one of the waveforms lags behind the other by a ¼ period. Therefore, since a difference is generated in the relationship of the two waveforms depending on the rotating direction of the output shaft 12 of the motor 2, the rotation number of the motor 2 can be precisely counted by using the difference described above. In other words, the position of the lens-barrel 4 can be precisely detected.

Therefore, since the position detecting device 1 in accordance with the embodiment of the present invention can detect the position of the lens-barrel 4 by using the sensor chip 8, the space required for mounting becomes smaller in comparison with the case of the photo interrupter and thus downsizing can be attained. In addition, when the rotating direction of the output shaft 12 of the motor 2 is detected by using the photo interrupter, two photo interrupters are required. However, in the position detecting device 1 in accordance with the embodiment of the present invention, the rotating direction of the output shaft 12 of the motor 2 can be detected by using only one sensor chip 8, and thus further downsizing can be attained.

Moreover, the position detecting device 1 in accordance with the embodiment of the present invention utilizes the sensor chip 8 having at least a magneto-resistive element, and thus the electric power consumption is low in comparison with that, for example, in the photo interrupter. Accordingly, the power-saving and the service life of the battery can be improved. Concretely, for example, when an applied voltage is 5 V, the operating current in the sensor chip 8 having the magneto-resistive element is equal to or less than 1 mA and therefore, the electric power consumption is low in comparison with the operating current (10 mA) in the photo interrupter. Accordingly, the position detecting device 1 in accordance with the embodiment of the present invention can attain miniaturization and power-saving.

Moreover, in the position detecting device 1 in accordance with the embodiment of the present invention, the sensor chip 8 is accommodated in the chip receiving recessed part 61 formed on the case 13 and the magnets 53, 54 are accommodated in the magnet receiving recessed part 55 formed on the gear. Therefore, the extra space for mounting the sensor chip 8 and the magnets 53, 54 is not almost required, and thus further miniaturization can be attained.

Further, the magnets 53, 54 can be easily positioned and the positional displacement of the magnets 53, 54 can be prevented by accommodating the magnets 53, 54 in the magnet receiving recessed part 55 and thus appropriate waveforms are easily obtained.

As the magnets 53, 54 are used a disk-shaped magnet in which its half portion in the circumferential direction is magnetized in the N-pole 51 and its remaining half in the S-pole 52, and thus the positioning of the magnets 53, 54 with respect to the sensor chip 8 can be easily performed. The reason is that the more the number of poles of the magnet increases, the more precise accuracy is required for the positioning of the magnet to the sensor chip 8. When a photo interrupter is used, the positional accuracy of the photo interrupter affects the phase of output of the photo interrupter and is determined by part accuracies of the photo interrupter, a holder for holding the photo interrupter and the like. The reason is that the photo interrupter is fit and held in the recessed part provided on the holder and the variation easily occurs in the output from the photo interrupter by assembling errors.

Further, the magnets 53, 54 are attached to the output shaft 12 of the motor 2 or the first gear 21 of the output shaft 12, and thus the number of revolutions of the motor 2 can be accurately detected. The reason is that, in the case the magnets 53, 54 are fixed on a gear far away from the output shaft 12 in the path for transmitting the drive of the output shaft 12 of the motor 2, the positional detection accuracy may deteriorate when the rotational speed of the motor 2 is slow to reduce the number of revolutions of the output shaft 12. Alternatively, the positional detection accuracy may be deteriorated by the backlash between gears.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A position detecting device for detecting a position of a movable body which is moved by a drive system having a rotation body comprising:
   a magnetic part including an N-pole and an S-pole on a face of the rotation body, the face being perpendicular to a rotation shaft of the rotation body, and
   a sensor chip including at least a magneto-resistive element and provided so as to face the magnetic part for detecting a variation of magnetic field by the magneto-resistive element when the magnetic part is rotated with the rotation body,
   wherein the magnetic part is a disk-shaped magnet formed in a smaller diameter than the transmission wheel and the magnet is accommodated in a magnet receiving recessed part provided on the transmission wheel.

2. The position detecting device according to claim 1, wherein the movable body is a lens-barrel whose focal length of a photographic optical system varies according to a movement in an optical axis direction by the drive system.

3. The position detecting device according to claim 1, wherein the magneto-resistive element in the sensor chip comprises a plurality of magneto-resistive elements and detection signals detected by the plurality of magneto-resistive elements are outputted as the detection signals of two phase sinusoidal waveforms shifted by 90 degrees from each other.

4. The position detecting device according to claim 1, further comprising a chip receiving recessed part provided on a fixed body for accommodating the sensor chip.

5. The position detecting device according to claim 1, wherein the magnet is magnetized in an N-pole over a half of a side face of the disk-shaped magnet in the circumferential direction and in an S-pole over a remaining half of the side face of the disk-shaped magnet.

6. The position detecting device according to claim 1, wherein the transmission wheel is attached on a rotation shaft of the motor and the magnet is mounted on the transmission wheel.

7. A position detecting device for detecting a position of a movable body which is moved by a drive system having a rotation body comprising:
   a magnetic part including an N-pole and an S-pole on a face of the rotation body; and
   a sensor chip including at least a magneto-resistive element;
   wherein the face of the magnetic part is perpendicular to a rotation shaft of the rotation body and the sensor chip faces the magnetic part for detecting a variation of magnetic field by the magneto-resistive element when the magnetic part is rotated with the rotation body,
   and the magnetic part is a disk-shaped magnet formed in a smaller diameter than the transmission wheel and the magnet is accommodated in a magnet receiving recessed part provided on the transmission wheel.

8. The position detecting device according to claim 7, wherein the movable body is a lens-barrel whose focal length of a photographic optical system varies according to a movement in an optical axis direction by the drive system.

9. The position detecting device according to claim 7, wherein the magneto-resistive element in the sensor chip comprises a plurality of magneto-resistive elements and detection signals detected by the plurality of magneto-resistive elements are outputted as the detection signals of two phase sinusoidal waveforms shifted by 90 degrees from each other.

10. The position detecting device according to claim 7, further comprising a chip receiving recessed part provided on a fixed body for accommodating the sensor chip.

11. The position detecting device according to claim 7, wherein the magnet is magnetized in an N-pole over a half of a side face of the disk-shaped magnet in the circumferential direction and in an S-pole over a remaining half of the side face of the disk-shaped magnet.

12. The position detecting device according to claim 7, wherein the transmission wheel is attached on a rotation shaft of the motor and the magnet is mounted on the transmission wheel.

* * * * *